United States Patent [19]
Cohen

[11] 3,934,559
[45] Jan. 27, 1976

[54] ANTI-POLLUTANT SPHERICAL ROTARY ENGINE WITH AUTOMATIC SUPERCHARGER

[75] Inventor: William A. Cohen, Brooklyn, N.Y.
[73] Assignee: Sphero International Company, West Long Branch, N.J.
[22] Filed: Mar. 10, 1975
[21] Appl. No.: 556,707

[52] U.S. Cl. .................................. 123/8.45; 418/68
[51] Int. Cl.² ........................................ F02B 53/00
[58] Field of Search............. 123/8.45, 43 R; 418/68

[56] References Cited
UNITED STATES PATENTS

| | | | |
|---|---|---|---|
| 1,880,131 | 9/1932 | Gray ....................... | 418/68 |
| 2,043,544 | 6/1936 | Kempthorne ..................... | 418/68 X |
| 2,069,646 | 2/1937 | Cohen............................... | 123/8.45 |
| 3,176,667 | 4/1965 | Hammer ........................... | 123/43 R |
| 3,549,286 | 12/1970 | Moriarty............................ | 418/68 X |

Primary Examiner—William L. Freeh
Assistant Examiner—Michael Koczo, Jr.

[57] ABSTRACT

The rotary engine includes a casing having a spherical cavity, or working sphere, therein and an engine shaft rotatably mounted in the casing. A driven cylindrical member, or drum, having four combustion chambers therein is rotatably mounted within the casing bisecting the spherical cavity, and said driven member is connected to the engine shaft. A hollow driving circular member, or plate, operatively connected to the driven cylindrical member by passing through the center thereof and is mounted within the spherical cavity, or working sphere, of the casing. The intersection of the driven cylindrical member by the driving circular member forms four spherical wedge-shaped variable volumes referred to as "compression-expansion" chambers, within the working sphere. It is the expansion of the ignited gases within the compression-expansion chambers that drives the circular member, or plate, which in turn rotates the driven cylindrical member, or drum, that drives the engine shaft. Within the hollow circular driving member are four variable volume air "intake compartments" supplied with fresh air through rotating valves on stationary air intake tubes. Air in the intake compartment, after being compressed, is forced into the compression-expansion chamber through plate transfer port holes. The maximum expanded volume of air drawn into the intake compartment is considerably greater than the rated displacement of the combined volumes of the combustion chamber plus the compression-expansion chamber in the working sphere. Part of this air is used to scavenge the combustion chamber of residual burnt exhaust gases, which in passing through the exhaust manifold fosters the process of "after-burning" that reduces pollutants in the exhaust to the outer air. The remaining volume of air in the intake compartment, (still greater than the rated displacement) is then compressed in the combustion chamber, thereby maintaining a high level of "volumetric efficiency" even at high engine speeds.

40 Claims, 22 Drawing Figures

0°

30°

60°

90°

120°

3,934,559

ANTI-POLLUTANT SPHERICAL ROTARY ENGINE WITH AUTOMATIC SUPERCHARGER

Recent developments in engine design and widespread fuel shortages coupled with the rising cost of fuel have increased the efforts in this country and abroad in the area of developing a more efficient power plant for use in automobiles and the like. It is well known that the piston type reciprocating engine in common use today is a relatively inefficient system of converting the potential energy stored in fossil fuel into the kinetic energy required to propel an automobile.

One of the factors which contributes significantly to the inefficiency of the reciprocating engine is that this type of engine requires a crank type mechanism to convert the linear motion of a piston reciprocating within a cylinder into rotary motion to drive the engine shaft. In a rotary engine such a conversion is not required because this type of engine converts the potential energy of the fuel directly into rotary motion. This is an inherent advantage of rotary engines in general. However, certain difficulties have arisen with respect to particular features of certain rotary engines, such as the methods of sealing the rotor with respect to the cavity walls which have, up until now, reduced the efficiency of such engines.

One approach which eliminates the sealing problem is a rotary engine of spherical design such as the one invented by the inventor of the present invention and which became subject matter of U.S. Pat. No. 2,069,646 issued Feb. 2, 1937. This engine consisted of a driving plate which was rotatable within a hollow working sphere. The plate was variably intersected by a rotatable drum, the plate and drum dividing the hollow sphere into four "compression-expansion" chambers in the form of spherical wedges of varying dihedral angle. In this arrangement, the parts had a unidirectional rotation in contrast with the complete reversal of movement in reciprocating engines and thus provided a variety of important advantages inherent in the rotary engine.

This rotary engine, however, had certain disadvantages in that it required a complex system of chambers, manifolds and valves to provide for the required flow of air and exhaust. Also, internal heating was a problem. Adequate provision for cooling of the internal engine parts was not provided. Thus, difficulties because of the breakdown of the lubricant due to the extreme internal engine temperatures and the resultant overheating and destruction of the engine were present in this design.

In addition, no provision was made in the engine for maintaining the pressure of the air intake charge when the engine operated at high speeds, thereby causing the volumetric efficiency to be reduced. This adversely affected the performance of the engine. Moreover, no "after-burning" effect was inherent in the engine to reduce pollutants in the exhaust.

These difficulties stem mainly from the manner in which air flow is achieved within the engine. In the present invention, the air flow has been increased to assist in cooling the internal engine parts, maintain the air pressure of the air charge in the compression-expansion chamber, even at high speeds, and reduce pollutants by scavenging the compression-expansion chambers as well as the combustion chambers and to foster "after burning".

It is, therefore, a prime object of the present invention to provide a spherical rotary engine which, in general, is designed to increase the power output for a given displacement, decrease engine weight and bulk for a given displacement, increase engine efficiency, reduce vibration, and simplify the construction of an internal combustion engine.

Another object of the present invention is to provide a spherical rotary engine of the type having a plate, and a drum, both of which are movable within a hollow working sphere wherein the plate acts as the drive member and the drum the driven member, which when coupled to the engine shaft causes it to rotate about an axis parallel to the axis of rotation of the drum.

It is a second object of the present invention to provide a spherical rotary engine having a plate and a drum rotatable within a hollow working sphere wherein increased air flow is achieved without a complicated system of intake and exhaust manifolds in the engine casing.

It is a third object of the present invention to provide a spherical rotary engine having a plate and a drum rotatable within a working sphere wherein the plate is provided with an air intake compartment therein.

It is a fourth object of the present invention to provide a rotary spherical engine wherein means are provided in the intake compartment of the drive member which varies the volume of the intake compartment in accordance with the position of the drive member.

It is another object of the present invention to provide a spherical rotary engine wherein novel valve means are provided between the intake compartment and the compression-expansion chamber.

It is a further object of the present invention to provide a spherical rotary engine which is internally cooled by the intake of fresh air.

It is still another object of the present invention to provide a spherical rotary engine wherein the excess amount of intake air automatically supercharges the compression-expansion chamber.

It is still further object of the present invention to provide a spherical rotary engine wherein the exhaust gases are "after-burned" to reduce pollution.

In accordance with the present invention a spherical rotary engine is provided including a casing having a spherical cavity, or working sphere, therein and an engine shaft rotatably mounted in the casing. A driven cylindrical member, or drum, containing four combustion chambers therein is mounted for rotation within the casing, bisecting the spherical cavity, or working sphere. The driven cylindrical member, or drum, is connected to the engine shaft and causes it to rotate. A driving member in the shape of a hollow circular plate is rotatable within the spherical cavity, or working spere, and intersects the driven member passing through its center, thereby forming four variable volume spherical wedge-shaped compression-expansion chambers adjacent to the four combustion chambers in the driven member. Expansion of the ignited gases in the combustion chamber enlarges the volume of the compression-expansion chamber thereby causing the driving member, or plate, to rotate, which rotates the driven member, or drum, which then rotates the engine shaft.

The hollow circular driving plate is divided into four variable volume "intake compartments" which communicate with air intake tubes by means of rotating plate intake valves that cause a variation in the volume of the intake compartments according to the relative position of the driving plate with respect to the driven drum. In this manner air is sucked into the plate intake compartment as the volume thereof is increased by rotation of the driving plate. The rapid movement of this fresh air cools the internal surfaces of the driving member thereby preventing overheating of the engine. When an intake compartment is fully expanded and filled with fresh air, the intake valve closes, sealing off the compartment from the intake tube. Further rotation of the driving member, or plate, causes a decrease in the volume of the air intake compartment thereby compressing the air within and, at the proper time, air transfer portholes in the plate are uncovered permitting the compressed air to escape into the compression-expansion chamber of the working sphere thereby forcing the residual burnt cases therein, from the previous combustion cycle, out through an exhaust port in the housing.

The expanded maximum volume of the plate intake compartment is considerably larger than the maximum volume of the exterior compression-expansion chamber in the working sphere. In the air transfer process, a portion of the fresh air is used in scavenging the combustion chamber of the residual burnt gases therein (as mentioned above) out through the exhaust port in the housing into the exhaust manifold connected thereto. The mixture of fresh air with the incompletely burnt exhaust gases fosters the process of "after-burning" which reduces the amount of undesirable pollutants.

Subsequent rotation of the plate and drum closes the exhaust port and when the plate decreasing intake compartment approaches its minimum volume, the transfer of the remaining fresh air into the compression-expansion chamber is completed, and the transfer portholes are closed. The compression-expansion chamber is in the shape of a spherical wedge bounded by the interior of the spherical surface of the working sphere and the two semi-circular sides of the intersecting plate and drum. The dihedral angle (and volume) between plate and drum changes from a minimum to a maximum, and vice versa, during each half revolution of the drum. When the dihedral angle is maximum and the chamber is filled with the maximum volume of fresh air, the following contraction of the spherical wedge will ultimately compress the fresh air totally within the adjacent combustion chamber in the drum. At this point fuel is injected into the compressed air in the combustion chamber and then ignited by an electric spark plug. The resulting spontaneous explosive combustion increases the compressed pressure of the gases about four-fold and the ignited gas expands very rapidly forcing the enlargement of the compression-expansion chamber which causes rotation of the plate and consequently rotation of the drum which then drives the engine shaft.

The spherical rotary engine of the present invention has four combustion chambers within the drum, or cylindrical member, which operate in pairs. Two of the combustion chambers deliver a combined driving impulse in each half revolution of the cylindrical member, or two combined impulses in one revolution, thus, a comparable reciprocating engine would be a two-cylinder, two-stroke cycle type.

The spherical rotary engine of the present invention has an extremely smooth, vibrationless operation. There are no adverse inertial forces of reciprocating pistons, tappet rods, valves, valve lifters, springs, etc., all of which are sources of vibration and noise in the reciprocating engine. Also, there is no torsional vibration which is sometimes present in reciprocating engines due to the torque impulses impressed alternately on the front and rear ends of a lengthy crankshaft, which causes a slight windup and then unwinding of the shaft during its rotation.

In the rotary engine of the present invention, all moving parts rotate in a single direction. They are symmetrical in shape and therefore can be balanced individually so that when assembled, the total rotating mass will be dynamically balanced. Furthermore, the weight of the rotating drum can be made heavy enough to serve as a flywheel, storing the energy of the fluctuating torque impulses impressed on the driving plate during each half revolution and returning it to the engine shaft as a usable uniform torque during each full revolution of the drum.

To the accomplishment of the above and other objects as may hereinafter appear, the present invention relates to an improved spherical rotary engine as defined in the appended claims and as described in the specification, taken together with the accompanying drawings in which:

Figure 1:
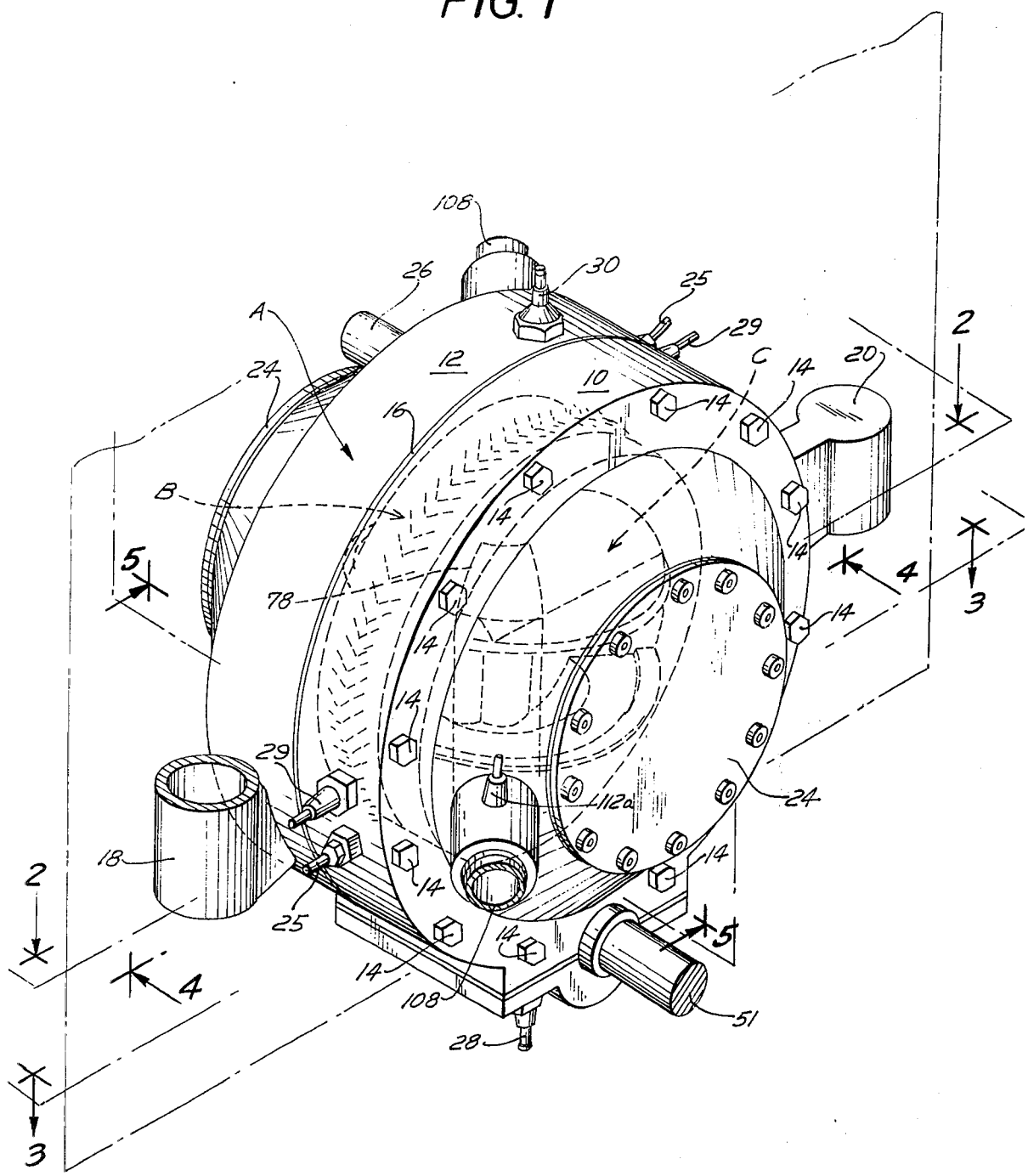
FIG. 1 is an isometric view of the spherical rotary engine of the present invention.

As best seen in FIG. 1, the spherical rotary engine of the present invention consists of a main engine housing or casing, generally designated A, comprising two halves, 10 and 12 which are rigidly bolted together at the outer circumference thereof by a plurality of housing bolts 14. A water-tight and oil-tight gasket 16 is utilized to achieve a complete seal between the exterior of the housing A and the hollow interior thereof which when the housing is assembled, forms a spherical cavity, or working sphere.

The housing A is provided with a number of ports and openings to permit entrance and egress of various fluids to and from the interior of the casing. A pair of exhaust ports 37 and 39 (FIG. 4) in the housing are connected to a pair of exhaust manifold conduits 18 and 20 (FIG. 2), one on either side of the casing, to permit the egress of burnt gases from the various combustion chambers within the drum and spherical cavity. A water inlet pipe (not shown) and a water outlet pipe 26 are provided to permit the flow of water through the engine to keep the temperatures thereof at a desired level. An oil inlet port 28 and an oil outlet port 30 are provided on the bottom and top, respectively, of the casing A to permit the flow of oil through the interior of the casing. A pair of fuel injection nozzles 25 are provided in the housing to permit the introduction of fuel into the combustion chambers. Adjacent to each fuel injection nozzle is an electric spark plug 29 which are utilized to ignite the fuel and air mixture in the combustion chambers at the appropriate instant.

As is best seen in FIGS. 2, 3, 4 and 5, the engine is provided with a plurality of water passages 22 through which water, introduced through the water inlet pipe, may flow through the engine to permit cooling of same. The water passages 22 are operably connected to water outlet pipe 26 through which the water will flow to the radiator (not shown) and after being cooled, will return to the water inlet pipe (not shown). A pair of cover plates 24 are bolted, one on either side of the engine, to provide access to the water passages 22 if necessary. The removable cover plates 24 are provided with the appropriate gaskets and stud bolts such that a water-tight seal is achieved.

It should be noted here that the rotary engine of the present invention would function just as efficiently if it were designed to be an air-cooled engine instead of water cooled. There are certain types of small vehicles including motorcycles where air-cooled rotary engines would be preferred.

Another desirable object of the present invention is to provide a spherical engine which is internally cooled by the intake of an excessive amount of fresh air which automatically supercharges the combustion chambers. This operation would be improved by conduits (not shown in these drawings for the sake of simplicity) connecting the intake tubes to a rectangular box-like plenum chamber which has on the opposite face an oval-shaped funnel. The funnel side of the plenum is placed in front of the engine's cooling fan so that part of the fan's discharge is directed into the funnel and plenum. This will pressurize the intake tubes thereby assisting the suction of the expanding intake compartment and which will therefore fill them with a larger volume of air at a higher pressure before the inlet valve closes. Thus, the combustion chambers would be supercharged to an even higher degree. Also, since the speed of the engine cooling fan and air discharge is proportional to engine speed, the degree of supercharging would be proportional to engine speed so that the high level of supercharging would remain fairly constant throughout a wide range of engine speeds.

Figure 6:
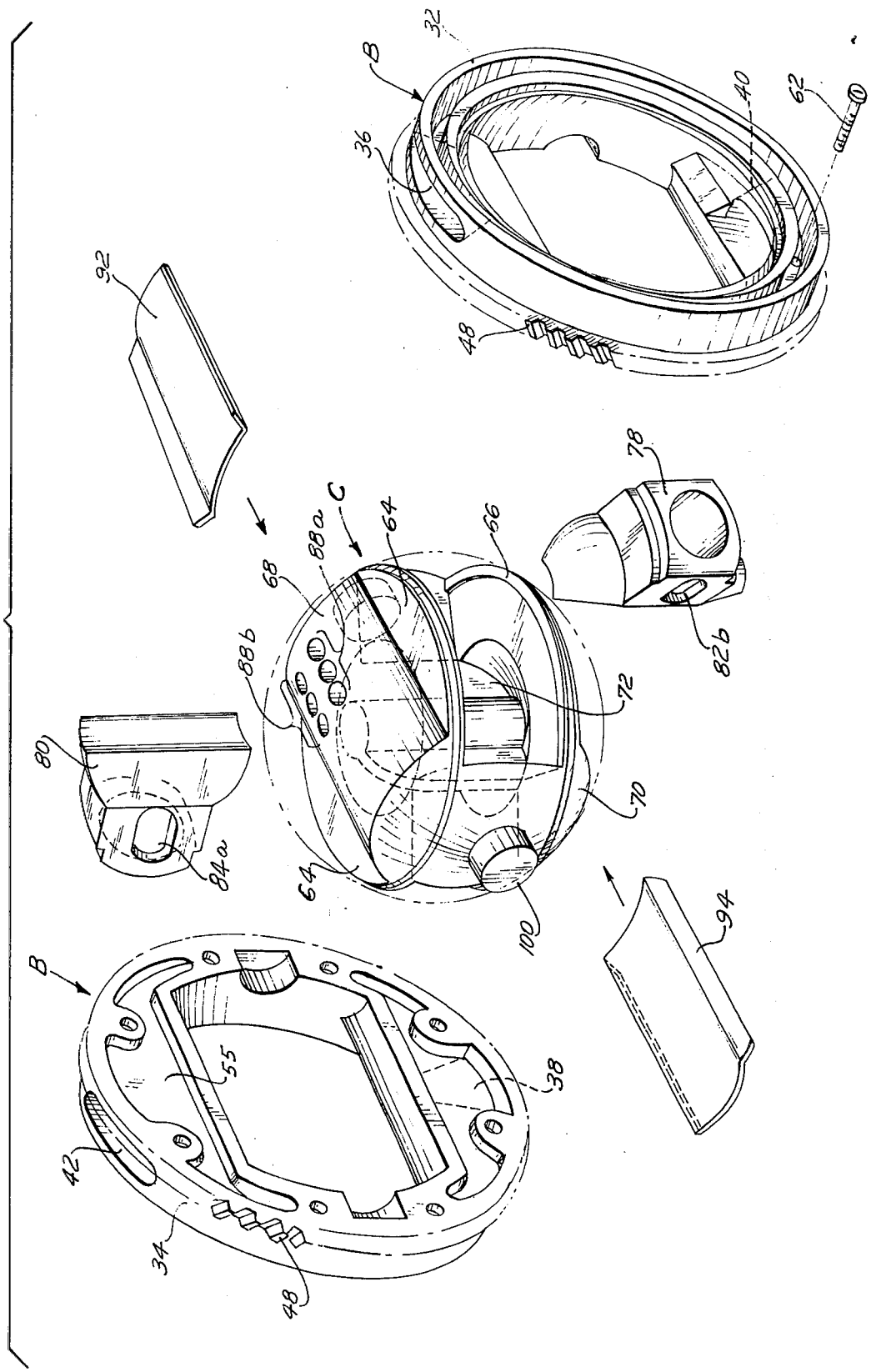
FIG. 6 is an exploded isometric view of a portion of the engine, namely, the plate and drum of the present invention.
Figure 7:
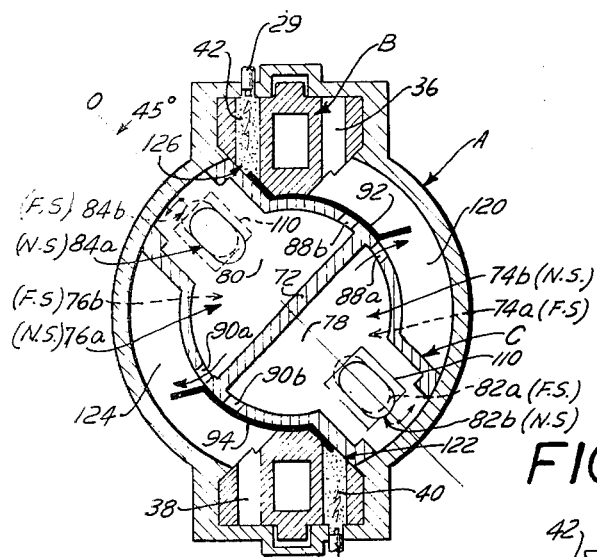
FIGS. 7–21 are schematic views of a portion of the engine of the present invention as the cylindrical drum is rotated throughout a 360°cycle.

As best seen in FIG. 6, within the spherical cavity, or working sphere, of housing A, is the driven cylindrical member, or drum, generally indicated B, which bisects the working sphere. Also shown, passing through the center of the drum is the driving circular member, or plate, generally indicated C. Drum B rotates on an axis line perpendicular to the plane of the drum, which passes through its center and the center of the spherical cavity, or working sphere. The drum consists of symmetrical halves 32 and 34 which are rigidly bolted together by bolts 62 after the plate assembly C has been inserted therebetween. One half of the drum contains the first and third combustion chambers 36 and 40, respectively, and the other half 34 of the drum contains the second and fourth combustion chambers 38 and 42, respectively.

Combustion chambers 36, 38, 40 and 42, located in the side faces of the drum are oval-shaped cavities extending from an opening at the top in the cylindrical outer face of the drum to an opening in the splayed face of the drum adjacent to the concave recess for the plate's cylindrical projection, wherein the compressed charge of air and fuel is ignited. After expansion of the burning gases into the adjacent compression-expansion chamber, or spherical wedge, which causes rotation of the driving plate C, the burnt gases are then expelled through the combustion chambers into the communicating exhaust ports 37 and 39 in the housing.

Figure 2:
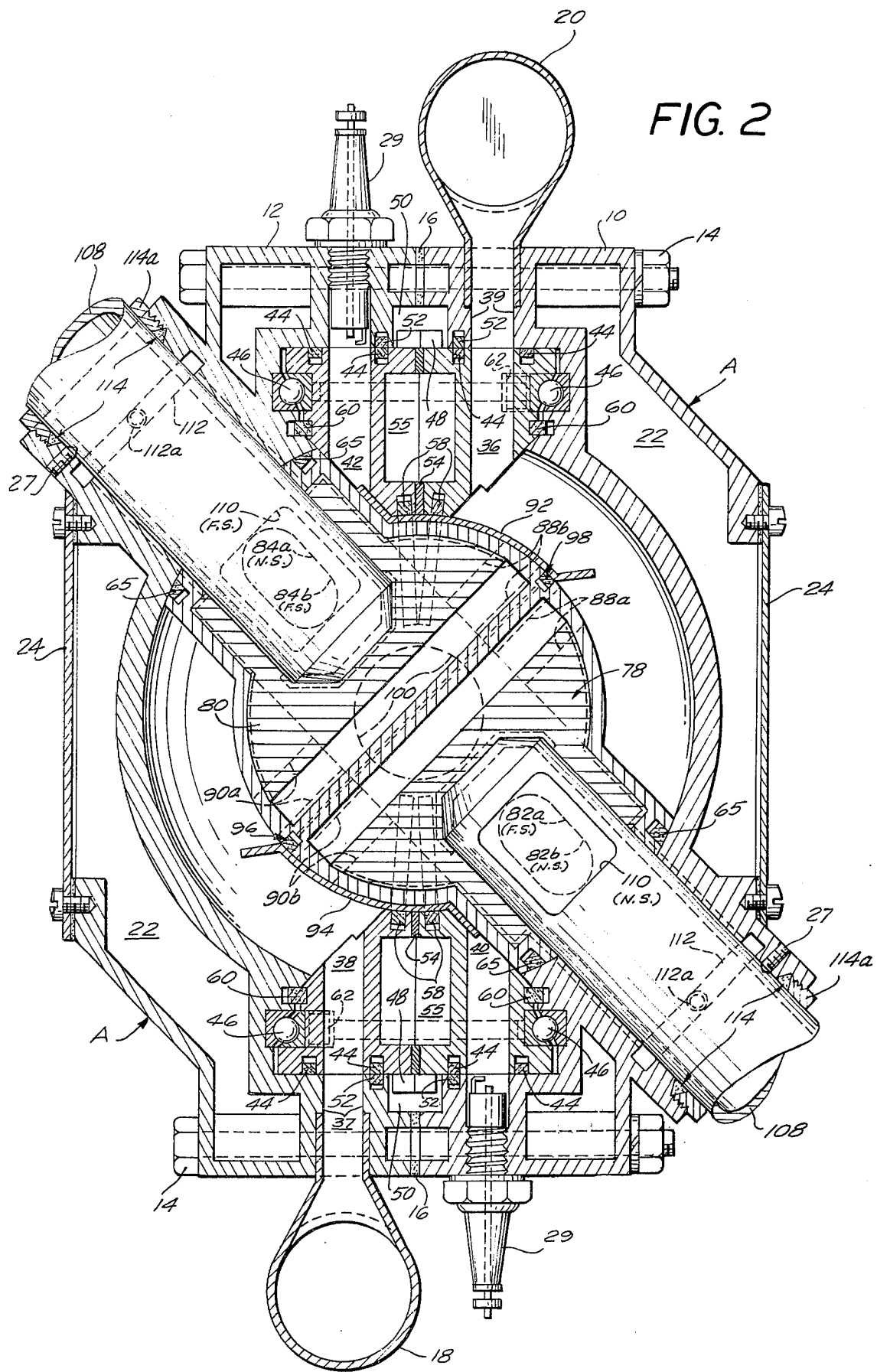
FIG. 2 is a top cross-sectional view taken along plane 2–2 of FIG. 1.
Figure 5:
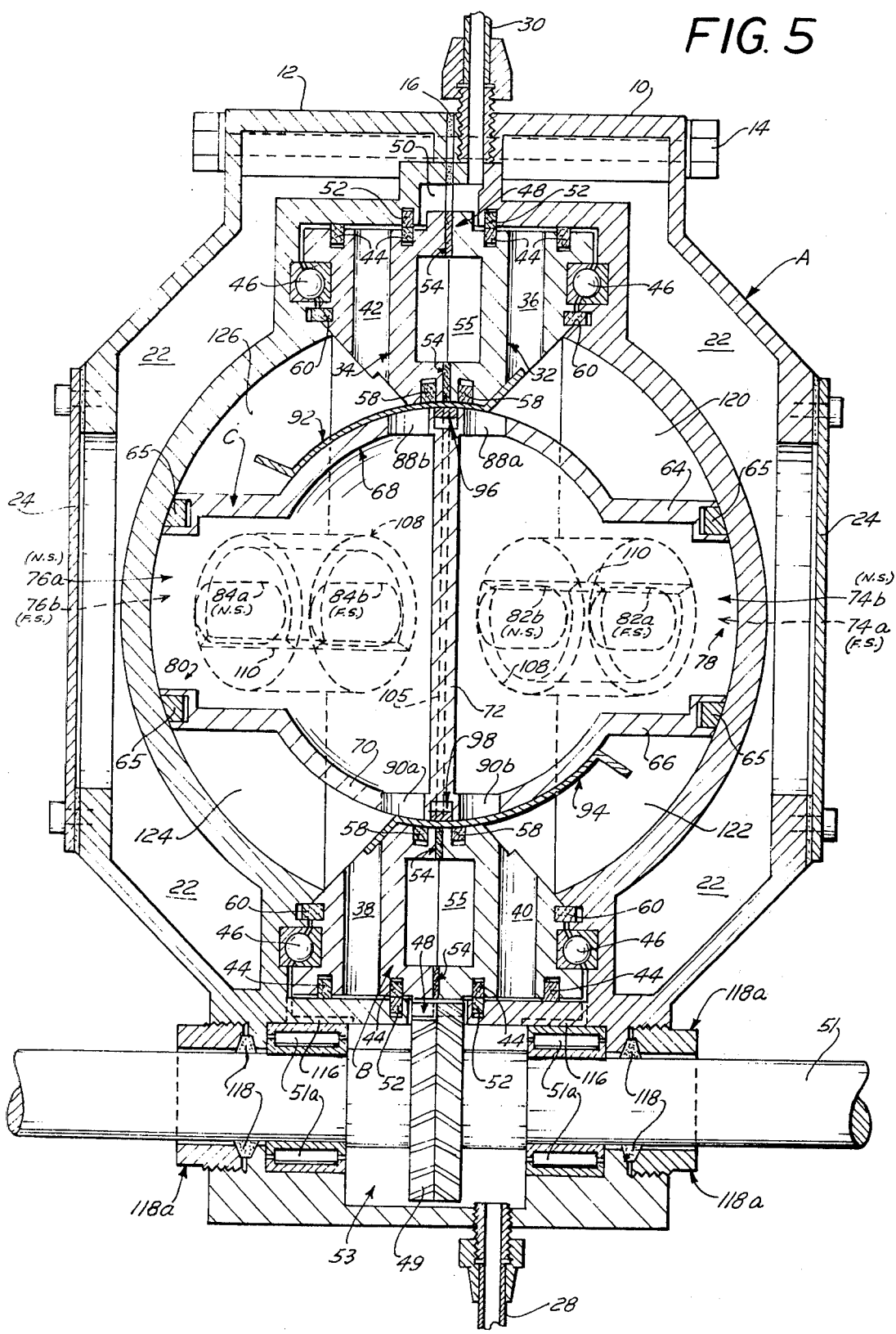
FIG. 5 is a vertical cross-sectional view of the engine along lines 5—5 shown in FIGS. 1 and 3.

As can best be seen in FIGS. 2 and 5, each of the combustion chambers 36, 38, 40 and 42 in drum B is provided with a combustion chamber seal 44 which is in the form of an oval-shaped spring steel expansion ring in a matching groove around the combustion chamber opening in the outer cylindrical surface of the drum B. Seals 44 provide a gas-tight sliding fit against the cylindrical surface of housing A. Drum B is supported within the housing by roller bearings 46, each consisting of two hardened steel ground races keyed into annular matching grooves in the drum B and housing A with the rolling balls bearing on diagonally opposite points in the races so as to support both radial and axial loads of the rotating drum while holding it perfectly centered in the working sphere.

A drum ring gear 48 is provided with raised spiral angle teeth on the cylindrical surface of each half 32, 34 of drum B. When the two halves of the drum 32 and 34 are bolted together, the gear teeth form a "herringbone" gear, which will mesh with corresponding teeth 49 on the outer surface of engine shaft 51 which is rotatably mounted in the casing along an axis parallel to the axis of rotation of cylindrical member, drum B. Thus, the rotation of cylindrical member, drum B serves to rotate engine shaft 51.

Figure 3:
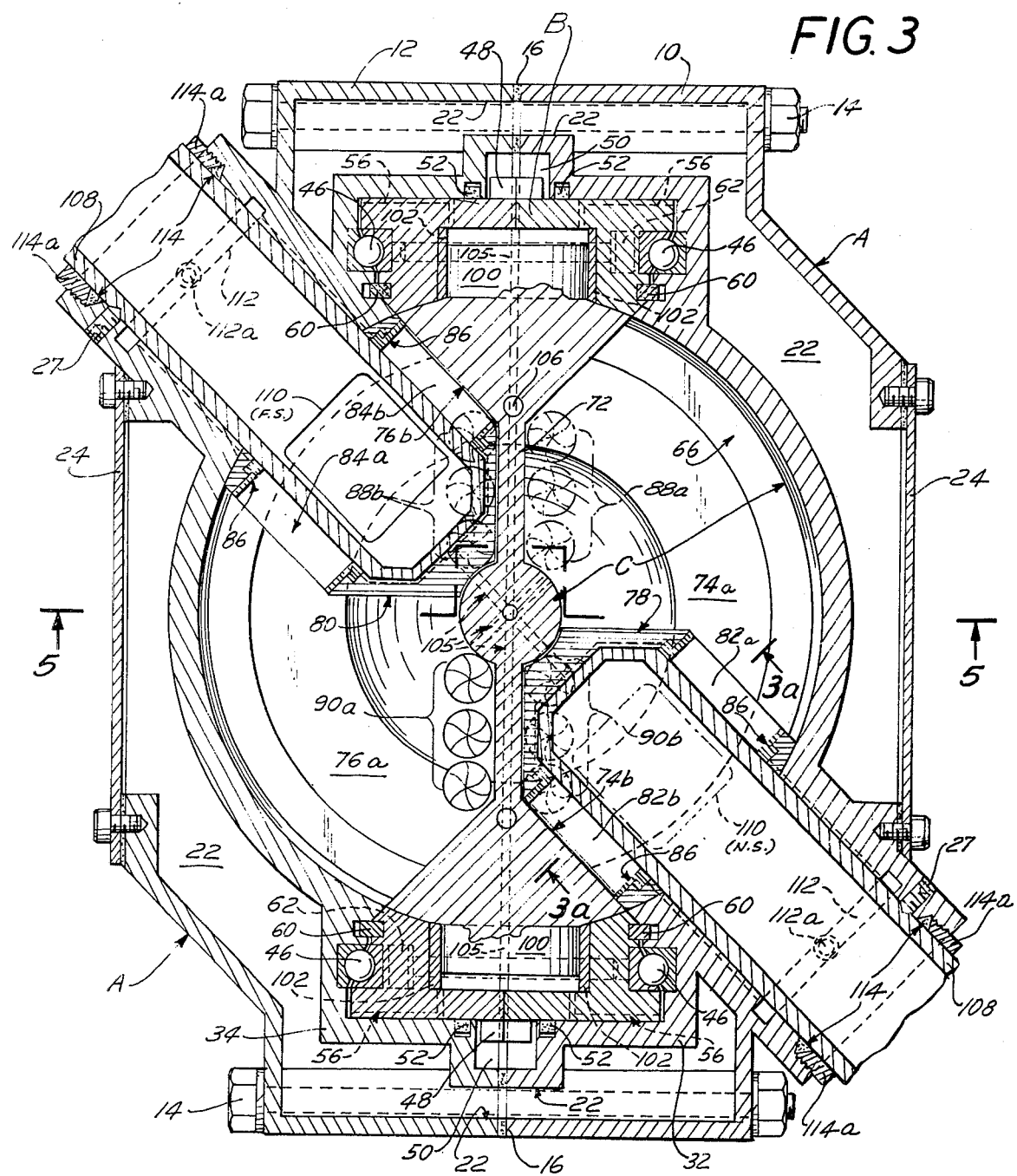
FIG. 3 is a cross-sectional view taken along plane 3—3 of FIG. 1.

As shown in FIGS. 2 and 3, a drum gear oil circulation space 50 is provided in the form of an annular channel in the housing A surrounding the drum ring gear 48 and connected to the oil well 53 (FIGS. 4 and 5) surrounding the engine shaft gear 49. Lubrication for the gears and cooling oil for the interior spaces of the drum are supplied by this oil circulation space. Drum oil seal rings 52, in the form of two circular spring steel expansion rings in annular grooves in the housing on both sides of the drum gear oil circulation space 50, provide a gas-tight and oil-tight sliding fit against the cylindrical surface of drum B.

Figure 4:
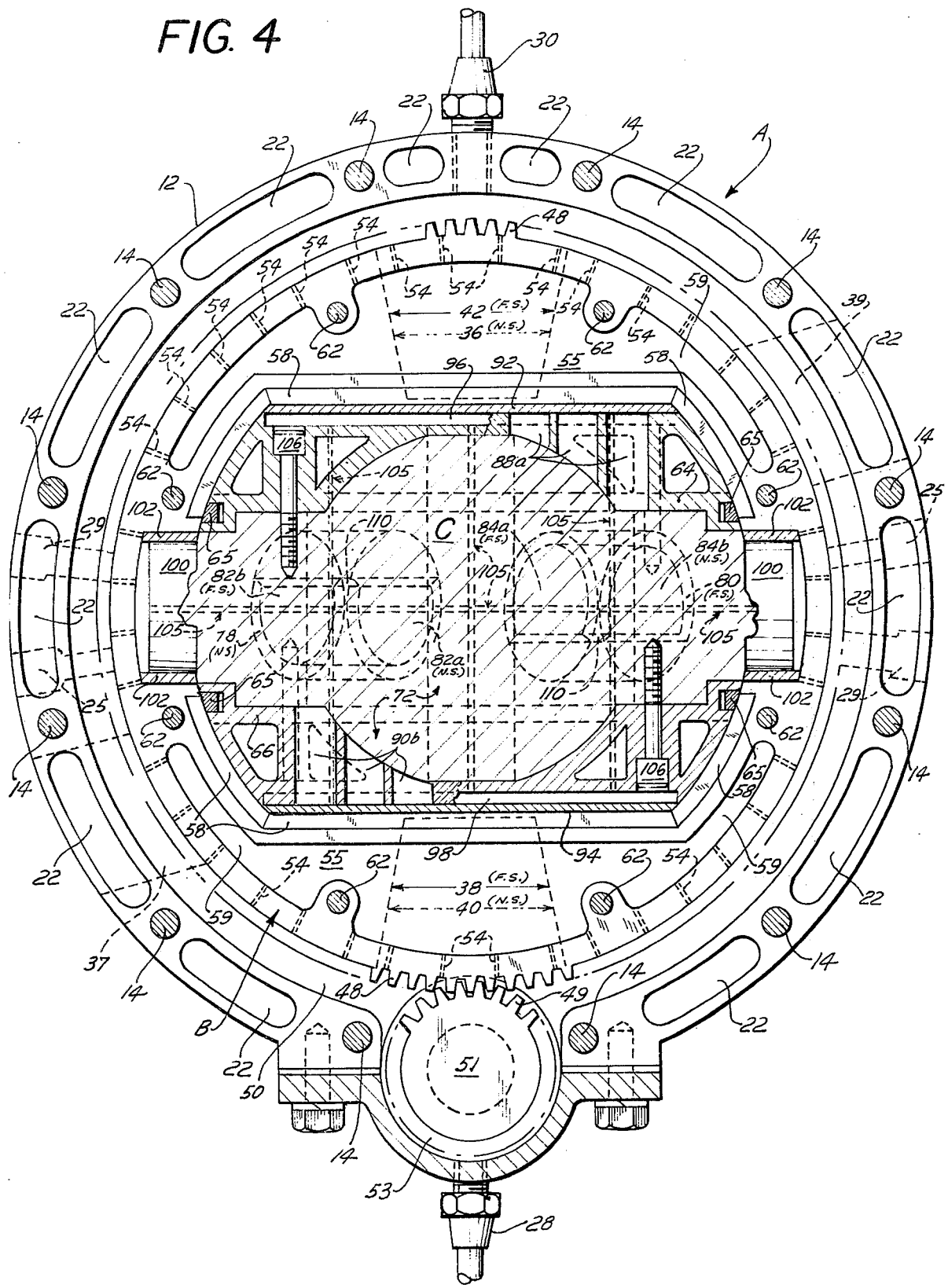
FIG. 4 is a side cross-sectional view along plane 4—4 of the engine shown in FIG. 1.

As shown in FIG. 4, drum B is provided with a plurality of radial oil holes 54 which are located in the cylindrical face of the drum, between the teeth of the drum ring gear, which permit oil under pressure in the drum gear oil circulation space 50 to enter and leave the interior spaces 55 of the drum for cooling purposes. The drum oil groove passages 56, as shown in FIG. 3, are located in the cylindrical face of drum B leading from the two plate trunnion bearing spaces therein outwardly to the edges of the drum and provide lubricating oil to the cylindrical surfaces of the drum and the housing and also to the drum roller bearings 46.

The cylindrical opening in the middle of drum B, with wedge-shaped edges is provided with plate sleeve valve seals 58, which are spring steel expansion strips in matching linear grooves in the drum's cylindrical concave edges which provide a gas-tight sliding fit against the convex faces of the plate sleeve valves 92 and 94.

As shown in FIGS. 2 and 4, the interior of the drum is provided with drum circulating oil spaces 55 which are internal spaces in the drum through which oil circulates for cooling purposes. As shown in FIG. 3, a pair of drum seals 60 in the form of two circular spring steel expansion rings in matching annular grooves in the sides of both drum and housing provide a gas-tight sliding fit against the drum.

The hollow circular plate assembly C is the driving element of the spherical rotary engine of the present invention. Plate C passes through the center of the drum and rotates on its center line axis which coincides with the center line axis of the intake tubes 108, and which is oblique to the plane of the drum and its axis. The center point of the plate C, drum B and working sphere coincide.

As best seen in FIGS. 5 and 6, the plate assembly C consists of two outer circular discs 64 and 66, spaced apart and each has a cylindrical projection, 68 and 70, respectively, on the outside face thereof along the diameter of each disc. Further, each disc is provided with a hemi-spherical recess centered on the inside face and fitting into the aforementioned outside cylindrical projection. On the periphery of the circular outer discs are provided plate seals 65, which are circular spring steel expansion rings (similar to piston rings) recessed in matching grooves in each disc. These seals provide a gas-tight sliding fit against the spherical surface of the working sphere.

As best seen in FIG. 3, between the outer discs 64, 66 of plate C is a steel plate partition member 72, situated perpendicular to the discs. Member 72 is integrally attached to discs 64, 66 by bolts 106, thereby providing an air-tight fit such that the hollow space between the discs is divided into two equal semi-circular volumes. Across the center of partition 72, perpendicular to the discs 64, 66 are two semi-circular cylindrical projections extending between the hemi-spherical recesses on the inside of the circular discs, one on each side of partition 72, against which the concave surfaces of the two intake valves 78, 80, slide with an air-tight fit. These interior semi-circular volumes between the discs are subdivided by the intake valves 78, 80, into two variable volume intake compartments 74a and 74b, on one side of partition 72, and two variable volume intake compartments 76a and 76b on the other side of partition 72. In the position shown in FIG. 3, the plate is perpendicular to the drum and in this position intake compartments 74b and 76b are at their minimum volume, approximately zero, while intake compartments 74a and 76a are at their maximum volume. Intake compartment 74a serves combustion chamber 36, and intake compartment 74b serves combustion chamber 40. On the other side of partition 72, intake compartment 76a serves combustion chamber 38, and intake compartment 76b serves combustion chamber 42. Thus, the hollow plate C contains four variable volume fresh air intake compartments, each serving one of the four combustion chambers in the drum.

Referring again to FIG. 3 wherein the position of plate C is perpendicular to drum B, rotation of the plate and drum in the clockwise direction, (when viewed from the right side of the engine), will start increasing the volume of intake compartment 74b, between the intake valve 78 and the center partition 72, and valve port opening 82b will start traversing intake tube port opening 110, thereby sucking fresh air into the expanding intake compartment 74b. At the same time, intake compartment 74a which is at its maximum volume filled with fresh air, previously drawn in, will start contracting in volume, thereby compressing the air within while valve port opening 82a starts traversing the blank side of intake tube 108. Similarly, on the other side of partition 72, the intake compartment 76b will start increasing in volume and the valve port opening 84b will start traversing the other intake tube port opening 110, sucking in fresh air into the expanding intake compartment 76b, and at the same time intake compartment 76a, which is at its maximum volume, filled with fresh air, previously drawn in, will start contracting in volume thereby compressing the air within while the valve port opening 84a starts traversing the blank side of intake tube 108. The contracting intake compartments 74a and 76a, compressing a charge of air within will subsequently discharge the compressed air through plate transfer portholes 88a, 90a, respectively, into the compression-expansion chambers or spherical wedges 120 and 124, (FIG. 5) respectively, outside of the plate within the working sphere, communication with combustion chambers 36 and 38, respectively. In the following half revolution of the drum, intake compartments 74b and 76b will similarly supply air to combustion chambers 40 and 42, respectively.

Figure 3A:
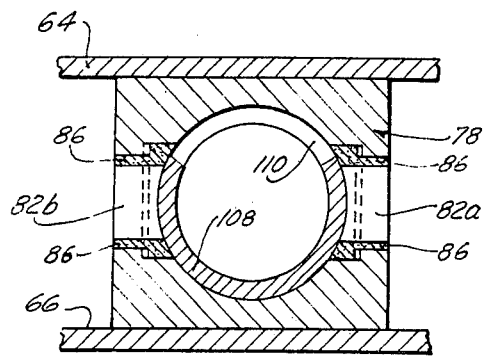
FIG. 3a is a cross-sectional view taken along line 3a—3a of FIG. 3.

Valve transfer port openings 82a, 82b, and 84a, 84b are oval shaped and have oval shaped spring steel expansion insert seals 86 (FIG. 3a) which press against the cylindrical surface of the inlet tube providing a gas-tight sliding fit around the valve port openings. Each of the cylindrical projections 68 and 70 of the circular discs 64 and 66 are provided with two sets of plate transfer holes 88a, 88b and 90a, 90b, respectively. These sets of holes are located adjacent to the interior plate partition member 72 and permit the transfer of compressed air from the plate intake compartments into the spherical wedges of the working sphere.

Plate sleeve valves 92 and 94 in the form of thin cylindrical steel plates with outwardly extending bent edges are provided to fit snugly over the convex cylindrical projections 68 and 70 of the plates outer circular discs 64 and 66 and against the concave cylindrical edges of the drum. These sleeve valves have a gas-tight sliding fit on their concave and convex surfaces. The sleeve valves 92 and 94 slide around on the cylindrical portions of the plate discs first covering one set of the transfer portholes to one plate intake compartment and then uncover another set of transfer portholes to the other plate intake compartment located on the opposite side of the interior partition member 72.

A pair of plate sleeve valve seals 58 are provided for each of the plate sleeve valves 92, 94, respectively. These plate sleeve valve seals are spring steel expansion strips in linear grooves in the concave edges of drum B, and provide a gas-tight sliding fit against the convex surfaces of the plate sleeve valves. Centered on the cylindrical projections of the plates circular discs and located between plate transfer portholes 88a, 88b and 90a, 90b, are two spring steel expansion strip seals, 96 and 98, in recessed linear grooves which provide a gas-tight sliding fit against the concave surfaces of the plate sleeve valves 92 and 94.

As best seen in FIG. 4, a pair of plate trunnions 100, which are cylindrical extensions from the wedge-shaped ends of the plate partition member 72, and which fit into cylindrical babbit lined bearings 102, recessed in drum B, support the plate assembly C in the drum. These trunnions permit the plate assembly to oscillate on the center line axis of the plate's cylindrical projections which lies in the center line plane of the drum, as both the plate and drum rotate on their respective axes within the working sphere.

Plate C is provided with plate oil holes 105, best seen in FIG. 4, which are located in the center of the plate partition member 72 longitudinally from trunnion to trunnion, receiving oil from drum oil holes 54, and distributing it through cross-way holes leading through plate sleeve valve seals 96 and 98 to provide lubricating oil to the convex and concave cylindrical surfaces of the plate cylinders 68 and 70, and the plate sleeve valves 92 and 94. The plate oil holes 105, at the cylindrical projection at the center of the partition member 72, best seen in FIG. 3, lead to the concave surfaces of the plate valves, and thence into communicating oil holes 105 in the face of the concave surfaces of the plate valves, which lead to the ends of the intake tubes and there, through radiating oil grooves, lubricate the sliding surfaces between the plate valves 78 and 80 and the intake tubes 108.

The plate assembly is held together by four plate assembly bolts 106, best seen in FIG. 4, which are located behind the expansion strip seals centered on the cylindrical projections of the plate discs. These bolts are preferably of the hexagon socket type which screw into tapped holes in the center partition member 72 and when drawn up tightly make air-tight joints between the partition member and the plate outer discs. It should be appreciated, however, that though the circular discs 64 and 66 and the partition member 72 are rigidly bolted together, the plate valves 78 and 80 rotating on the ends of the intake tubes 108 are free to move between the plates outer discs in a semicircular path with an air-tight sliding fit against the inner surfaces of the plate discs.

As indicated above, fresh air enters the engine of the present invention by means of a pair of cylindrical air intake tubes 108 which are held stationary by set screws 27, in the engine housing A on a common axis line. The plate valves 78 and 80 rotate on the ends of the air intake tubes 108 thereby permitting the entire plate assembly to rotate on the center line axis of these tubes. Each of the tubes is provided with an intake port opening 110 preferably rectangular in shape, best seen in FIG. 3, over which traverse the oval-shaped valve port openings 82a, 82b, of plate valve 78, and oval-shaped valve port openings 84a, 84b, of plate valve 80, thus permitting fresh air to be drawn into the plate's intake compartments 74a, 76a, shown fully expanded, and 74b, 76b, shown fully contracted.

As shown in FIG. 3, annular oil wells 112, supplied by inlet pipes 112a, are located in the engine housing around intake 108 and which supply lubricating oil to the sliding surfaces between the plate valves 78, 80, and the intake tubes, as well as the inside faces of the plates discs 64, 66, and also the sliding surfaces between the circular edges of the discs and the spherical surface of the working sphere. Intake oil seal packing rings 114, are located in the housing around the intake tubes and are provided with pressure adjusting threaded nuts 114a, for adjusting the pressure of the packing rings around the intake tubes so as to prevent oil leakage outward beyond the oil seal packing rings.

As shown in FIG. 5, the engine shaft 51 is provided with needle-type roller bearings 51a, in hardened steel ground races. The outer races are keyed to the housing and the inner races are keyed to the engine shaft. Engine intake oil well 53, around the engine shaft 51 and its gear 49, supplies oil to the oil circulating space 50 around the drum ring gear 48, and the engine shaft bearings 51a. The oil grooves 116 in the housing adjacent to the needle bearings 51a, lead to the drum roller bearings 46 and to the sliding surfaces between the drum and housing. Engine shaft oil seal packing rings 118 are located in the housing around the engine shaft and are provided with pressure adjusting threaded nuts 118a, for adjusting the pressure of the packing rings around the engine shaft so as to prevent oil leakage outward beyond the oil seal packing rings.

FIGS. 7–21 are schematic representations of the relative positions of certain key elements of the spherical rotary engine of the present invention as the engine goes through one complete cycle of operation which corresponds to a 360° revolution of the cylindrical member, or drum B, and the circular member, or plate C. For ease of understanding the sequence of operations taking place in only a single combustion chamber 42, which communicates with the variable volume spherical wedge, or compression-expansion chamber 126, within the working sphere, and said wedge communicates with the plate's variable volume intake compartment 76b, through plate transfer portholes 88b uncovered by sleeve valve 92 and said intake compartment communicates with fresh air intake tube 108 through valve intake port opening 84b of the plate valve 80, which traverses over intake tube port opening 110, will hereafter be described. However, it should be noted that diagonally opposite sets of combustion chambers, compression-expansion spherical wedges of the working sphere, and air intake compartments within the plate, go through the same operations simultaneously. Thus, what is happening in one set of these related spaces is equally applicable to the opposite set of related spaces.

Consider combustion chamber 42, located in the upper left hand corner of the diagrams. The variable volume wedge-shaped compression-expansion chamber 126 communicates with combustion chamber 42. The plates intake compartment 76b, which is on the far side of the plate valve 80, is the air intake compartment which feeds compression-expansion chamber 126 through plate transfer portholes 88b. The intake tube 108 is shown as having a rectangular port opening 110 which communicates with the oval-shaped plate valve intake port opening 84b (shown in dash lines) in the intake compartment 76b. The plate sleeve valve 92 regulates the passage of air from the intake compartment 76b through transfer portholes 88b into the spherical wedge-shaped compression-expansion chamber 126, which communicates with combustion chamber 42. It should be understood throughout the following explanation that combustion chamber 40, compression-expansion chamber 122, and air-intake compartment 74b, will operate in the precise fashion at the same time as the previously mentioned related spaces connected with combustion chamber 42. The other diagonally opposite set of combustion chambers 36 and 38, and their respective combustion-expansion chambers 120 and 124, and their air intake compartments 74a and 76a operate in the same manner but 180° out of phase, that is, one-half cycle behind the described operations.

It should be noted in FIGS. 7 to 21, which show the successive positions of the drum and plate, that the driving plate is the active member causing the variations in the dihedral angle it makes with respect to the plane of the drum which causes the increase and decrease in the volume of the exterior compression-expansion chambers, or spherical wedges, and simultaneously the corresponding volume changes in the plate's interior intake compartments.

When drum B is at position zero degrees of rotations, (FIG. 7), an axis line drawn longitudinally through the center of the plate, perpendicular to the plate partition member 72 (hereinafter referred to as the reference line), makes an angle of 45° with the vertical. From this reference line the dihedral angle between plate and drum is measured in the counter clockwise direction. The compression-expansion chamber, or spherical wedge 126 is at its minimum volume, the combustion chamber 42 opening onto the working sphere is flush against the flat face of the driving plate and the combustion chamber 42 contains a compressed charge of air into which liquid fuel is just being injected and the combustible charge ignited by the electric spark plug 29. The resulting explosive pressure of the gas presses against the flat face of the plate and also the extended edge of the plate's transfer port sleeve valve 92 and begins to rotate the plate and sleeve valve in the counter clockwise direction relative to the plane of the drum, while the plate rotates the drum in the clockwise direction, when viewed from the right side of the diagrams. In the meantime, intake compartment 76b which is half expanded continues to expand sucking in a new supply of fresh air through the valve port 84b which is traversing the intake tube port opening 110.

Figure 8:
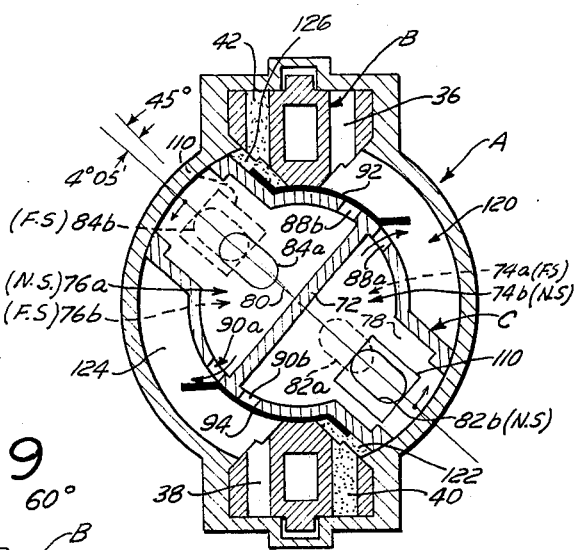

FIG. 8, shows the engine when drum B has advanced to the 30° position. The reference line has moved 4° 05' in the counter clockwise direction which means the dehedral angle between plate and drum has increased from 0° to 40° 05', due to the expansion of burning gases in combustion chamber 42 and its communicating compression-expansion chamber 126, which no longer is at a minimum volume, but is now expanding and driving the plate. The plate's intake compartment 76b is now slightly more than half expanded and continuing to expand sucking in a new supply of fresh air through the valve port 84b traversing the intake tube port opening 110.

It should be noted that the pressure of the expanding burning gases in chamber 126m as it drives the plate, holds the extended edge of the sleeve valve 92 hard against the flat face of the plate until the time when the opposite extended edge comes up against the sloping wall of combustion chamber 36. Until this point is reached sleeve valve 92 remains stationary relative to the plate's cylinder and together both rotate in the counter clockwise direction. The sleeve valve can only be in one of two positions relative to the plate and drum. The extended edge will move with flat face of the plate because of the expanding gas pressure holding it there, until slightly before the 90° position of the drum is reached (FIG. 10) at which time the opposite extended edge of the sleeve valve 92 comes up against the sloping flat face of combustion chamber 36, and thereafter the extended edge will be held there until the 180° position of drum rotation is reached (FIG. 14) at which point combustion chamber 36 will be fired and the explosive gas pressure of combustion will hold that extended edge of sleeve valve 92 hard against the opposite flat face of the plate.

Figure 9:
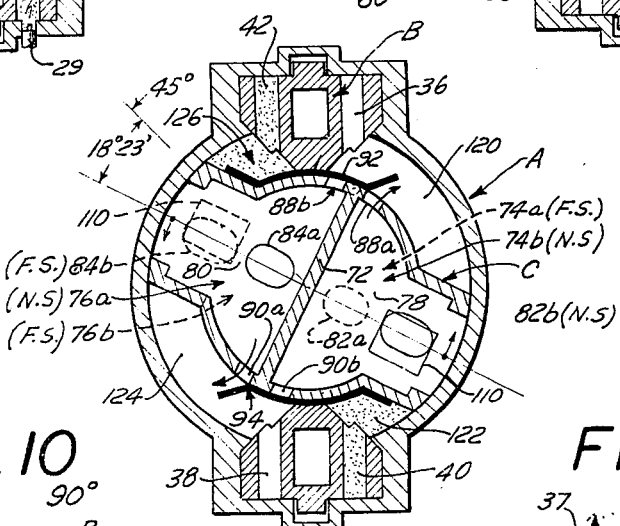

FIG. 9, shows the cylindrical member, or drum B in the 60° position. The reference line has moved 18° 23' from the original position. The burning gases in combustion chamber 42 and its communicating spherical wedge 126 continues to expand driving the plate in the counter clockwise direction. The plates intake compartment 76b is now considerably more than half expanded and continuing to expand sucking in a new supply of fresh air through the valve port 84b traversing the intake tube port opening 110. Sleeve valve 92 continues to cover plate transfer portholes 88b, thus isolating the intake compartment from the compression-expansion chamber 126.

Figure 10:
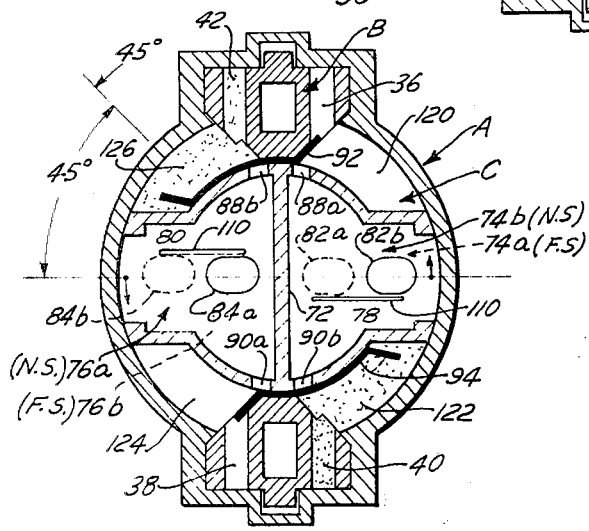

FIG. 10, shows the cylindrical member or drum B in the 90° position. The reference line has moved 45° from the original position. The burning gases in combustion chamber 42 and its compression-expansion chamber 126 continue to expand driving the plate in the counter clockwise direction. The opposite extended edge of the sleeve valve 92 is now hard against the splayed wall of combustion chamber 36 and from now on the plates cylindrical projection will be moving in the counter clockwise direction relative to the sleeve valve 92, so that transfer portholes 88b will now move towards the extended edge on the left side of sleeve valve 92. In this position the plate intake compartment 76b is at its maximum volume and thus filled with fresh air and further counter clockwise rotation of the plate will cause contraction thereof. Valve port 84b is no longer aligned with intake tube port opening 110, but will now traverse the blank side of the intake tube. However, after further counter clockwise rotation of the plate valve port opening 84a (shown in solid lines) will begin to traverse the intake tube port opening 110 thereby filling intake compartment 76a (on the near side in FIG. 10) with fresh air for combustion chamber 38.

Figure 11:
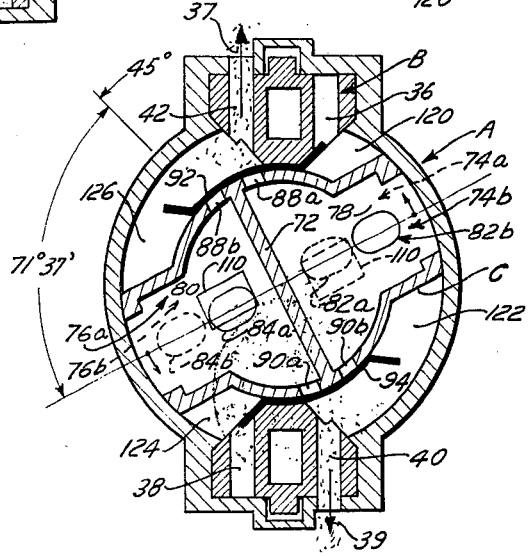

FIG. 11, shows the cylindrical member, drum B, at the 120° position. The reference line has moved 71° 37' from the original position. Combustion chamber 42 is now aligned with an exhaust port in the engine housing to permit exhaust of the expanded burnt gases in the compression-expansion chamber 126 through combustion chamber 42. Plate intake compartment 76b is contracting and compressing the complete charge of fresh air therein. Valve port 84b is traversing the blank side of the intake tube thereby isolating intake compartment 76b.

Figure 12:
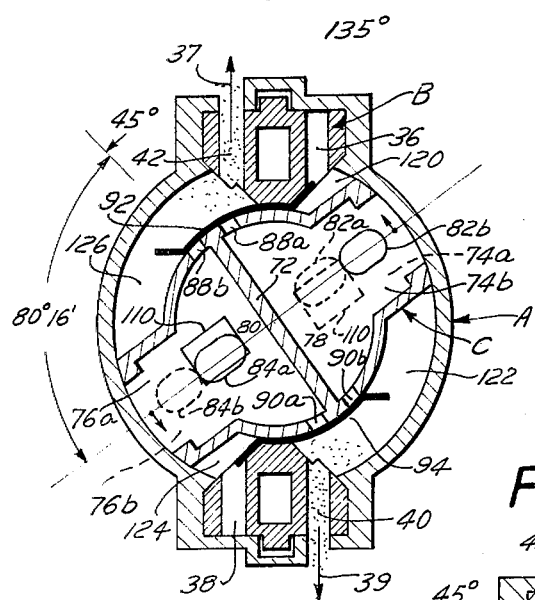

FIG. 12, shows the cylindrical member, drum B, at the 135° position. The reference line has moved to 80° 16' from the original position. Combustion chamber 42 is still aligned with the exhaust port and the burnt gases in the compression-expansion chamber 126 continue to flow through combustion chamber 42 into the exhaust port. Plate intake compartment 76b continues to contract and compress the charge of fresh air, while valve port 84b continues to traverse the blank side of the air intake tube.

Figure 13:
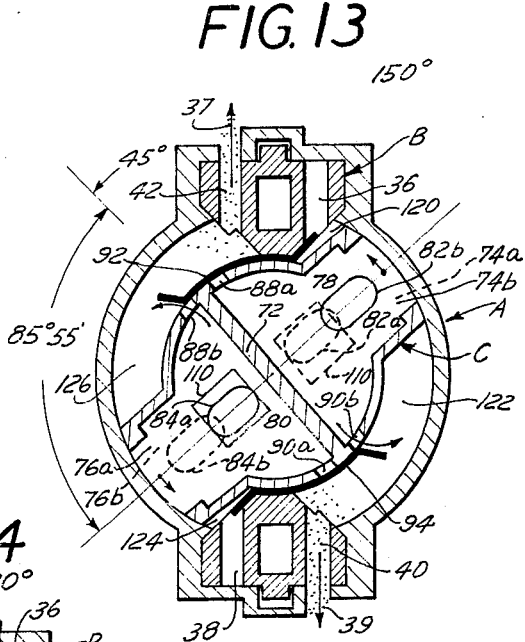

FIG. 13, shows the cylindrical member, drum B, at the 150° position. The reference line has moved 85° 55' from the original position. Combustion chamber 42 is still aligned with the exhaust port and exhaust is continuing. The plate cylinder in rotating counter clockwise has uncovered plate transfer portholes 88b from under the left edge of plate sleeve valve 92, and the transfer of compressed air in intake compartment 76b into the compression-expansion chamber 126 has begun, thereby helping to scavenge the residual burnt gases through the combustion chamber 42 into the exhaust port 37 and its connected exhaust manifold, where the mixture of fresh air with the burnt gases go through the process of "after-burning", which, by oxidation of the unburnt carbon particles transforms the carbon monoxide, a poisonous pollutant, into carbon dioxide, a harmless gas. Valve port 84b continues to traverse the blank side of the intake tube 108.

Figure 14:
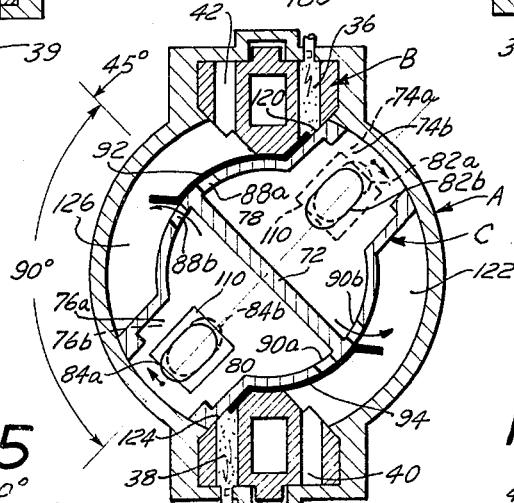

FIG. 14, shows the drum B, at the 180° position. The reference line has moved 90° from the original position, which is the maximum dehedral angle and volume of expansion of the spherical wedge or compression-expansion chamber 126. Combustion chamber 42 is no longer aligned with exhaust port 37, and exhaust cycle is finished. Plate intake compartment 76b is half contracted and continues to push fresh air into the compression-expansion chamber 126, and valve port 84b continues to traverse the blank side of the intake tube 108. The plate has now reached its maximum counter clockwise position and future rotation of the drum will cause the plate to reverse its direction of rotation relative to the drum into the clockwise direction.

Figure 15:
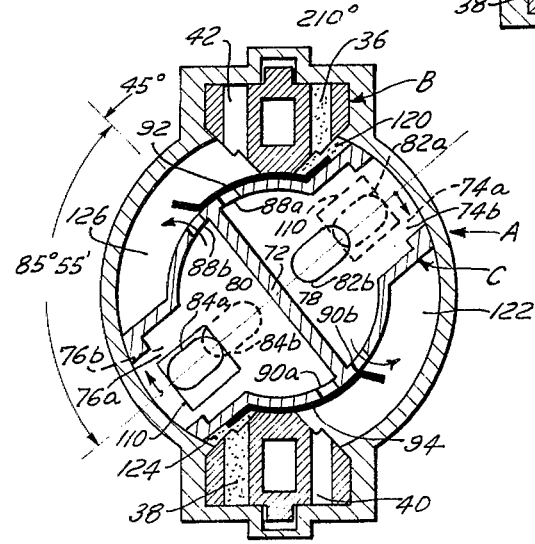

FIG. 15, shows the drum B at the 210° position. The reference line has moved back from 90° to 85° 55' from the original position. The plate C has reversed its direction and is now moving in the clockwise direction relative to the plane of drum B. Combustion chamber 42 and its compression-expansion chamber 126 are filled with fresh air and the remainder of the air in the intake compartment 76b is being pushed into the compression-expansion chamber 126. Both the intake compartment and the compression-expansion chamber are now contracting at the same time. Valve port 84b continues to traverse the blank side of the intake tube.

Figure 16:
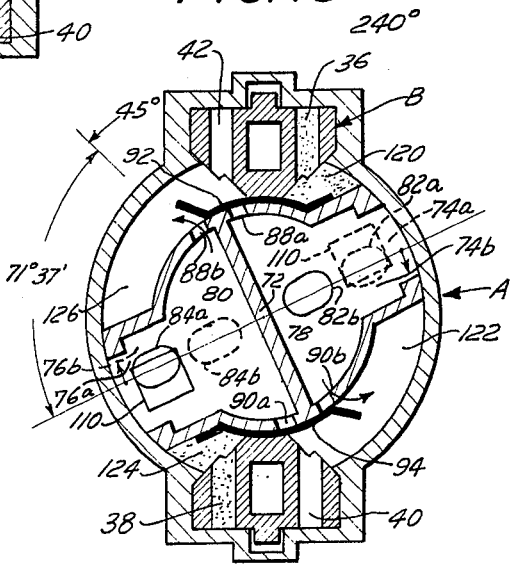

FIG. 16, shows the drum B, at the 240° position. The reference line is now 71° 37' from the original position. Combustion chamber 42 and its compression-expansion chamber 126 are filled with fresh air and the remaining portion of air in the plate intake compartment 76b is being pushed into the compression-expansion chamber 126. Both the intake compartment and the compression-expansion chamber are still contracting. Valve port 84b continues to traverse the blank side of the intake tube.

Figure 17:
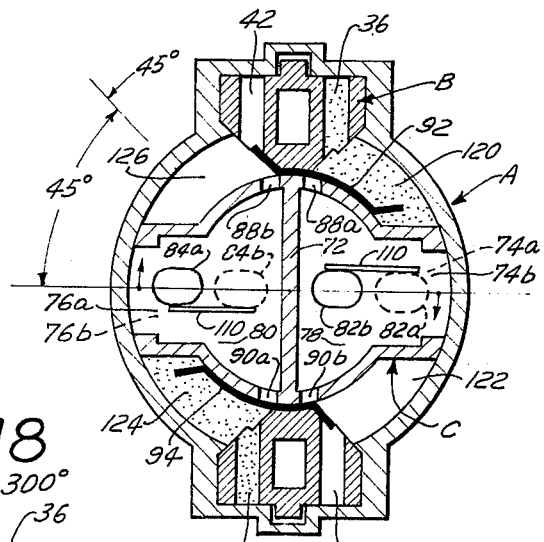

FIG. 17, shows the drum B, at the 270° position. The reference line is now 45° from the original position, and moving in the clockwise direction. Contracting plate intake compartment 76b has now reached its minimum volume position and fresh air transfer from plate intake compartment to compression-expansion chamber 126 has been completed. Further rotation of drum and plate will cause sleeve valve 92 to cover transfer portholes 88b, thereby closing the communication between plate intake compartment 76b and compression-expansion chamber 126, and valve port 84b will start traversing the intake tube port opening 110.

Figure 18:
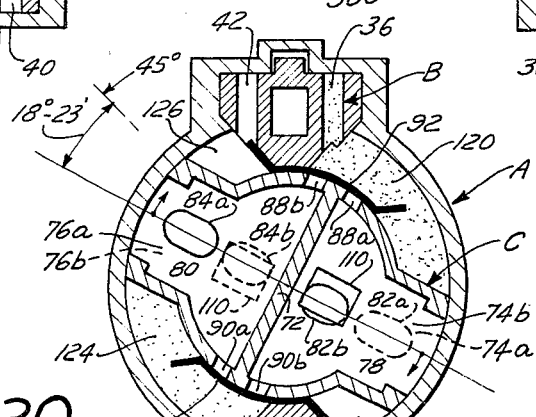

FIG. 18, shows drum B, at the 300° position. The reference line is now 18° 33' from its original position. Sleeve valve 92 has moved relative to transfer portholes 88b so as to close them completely, thereby isolating the intake compartment 76b from compressionexpansion chamber 126, which continues to contract, compressing the charge of air therein into combustion chamber 42. Intake compartment 76b is beginning to expand, sucking in a new supply of fresh air through valve port 84b which is now traversing intake tube port opening 110.

Figure 19:
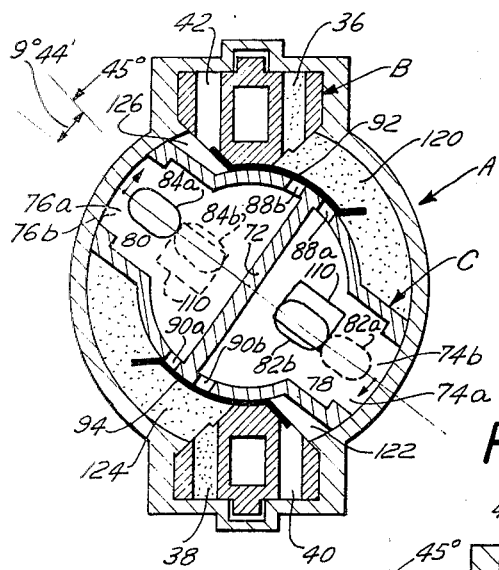

FIG. 19, shows drum B, in the 315° position. The reference line is 9° 44' from its original position. The charge of air within compression-expansion chamber 126 and combustion chamber 42 is being further compressed. Intake compartment 76b is expanding sucking in a new supply of fresh air through valve port 84b which is traversing intake tube port opening 110.

Figure 20:
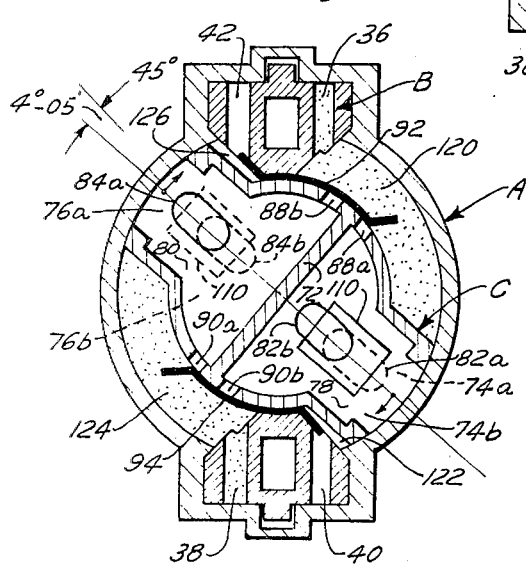

FIG. 20, shows drum B, in the 330° position. The reference line is now only 4° 05' from its original starting position. The charge of fresh air within compression-expansion chamber 126 and combustion chamber 42 is nearing completion of the compression cycle. The plate intake compartment 76b continues to expand sucking in a new supply of fresh air through valve port 84b which is traversing intake tube port opening 110.

Figure 21:
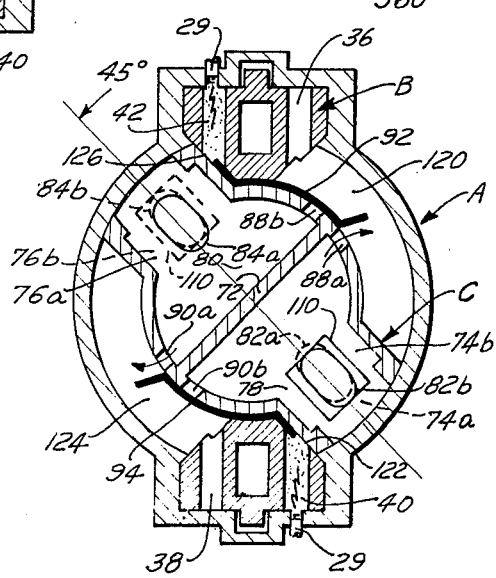

FIG. 21, shows drum B, in the 360° position. The reference line has returned to its original starting position. The new charge of fresh air which was in compression-expansion chamber 126 has now been compressed entirely into combustion chamber 42. The plate intake compartment 76b is now half expanded and continues sucking in a new supply of fresh air through valve port 84b which is traversing the intake tube port opening 110. At this point liquid fuel will be injected into combustion chamber 42 and the combustible charge ignited by spark plug 29, thus starting anew the complete cycle just described in FIGS. 7 through 21.

It should again be noted that combustion chamber 40 is diametrically opposite to the combustion chamber 42 and is similarly disposed with respect to the driving plate and thereof will go through the same cycle that combustion chamber 42 goes through and simultaneously therewith. Further, after a 180° rotation, combustion chambers 36 and 38 will be similarly disposed with respect to the opposite face of the driving plate and will likewise be ready to follow through the same cycle of operation simultaneously as the combustion chambers 42 and 40 did previously.

Therefore, in the single working sphere of this engine, two combustion chambers impart one combined impulse to the engine shaft in one-half revolution and the four combustion chambers impart two combined impulses in one complete revolution.

In the engine shown in the drawings, each of the four spherical wedges has a displacement of 5.25 cu. in. and a combined displacement of 21 cu. in. Each combustion chamber has a volume of 0.65625 cu. in. and the compression ratio is $5.90625 \div 0.65625 = 9:1$. the height of the plate cylinder is 3.42 in., the diameter of the cylinder is 3.42 in., and the width of the driving plate is 1.875 in. The plate's intake compartment volume is approximately 7.5 cu. in., or 1.44 times the displacement of one spherical wedge.

Since two combustion chambers deliver a combined driving impulse in each half revolution, or two combined impulses in one revolution, a comparable reciprocating engine would be a two-cylinder, two-stroke cycle type having a total displacement of 21 cu. in., or 10.50 cu. in. per cylinder. The bore of each cylinder would be 2.375 in., and the stroke 2.375 in., so that the cylinder's volume equals 10.50 cu. in. The combustion space at the top of the cylinder would have a volume of 1.3125 cu. in., so that compression ratio would be $11.8125 \div 1.3125 = 9:1$. The equivalent four-stroke cycle type engine would have four such cylinders two of which would deliver two impulses in each revolution and the displacement rating would be 42 cu. in.

It is known that the compression ratio is extremely important to the efficiency of an engine, and in particular the higher the compression ratio, the higher the thermal efficiency of the engine, the higher the fuel economy, and the greater the torque and the power obtained from an engine of given displacement. However, when the compression ratio exceeds certain limits, there is a possibility of self-ignition due to the heat of compression which results in knocking or detonation. In the operation of both the reciprocating and spherical engines, there is a positive pressure caused by the combustion of the charge and simultaneously a negative pressure due to the compression of a fresh air charge in either the second sylinder of the two-cylinder engine or the two spherical edges on the opposite side of the driving plate in the rotary engine. Therefore, the negative pressures must be subtracted from the positive pressures in order to derive the net positive pressure causing rotation. Computations show that the compression ratio in the reciprocating engine drops more rapidly than the compression ratio in the rotary engine, especially in the early stages of volume expansion, and that the rate of drop does not slow down to equal the rate of drop in the rotary engine until after the 120° position of rotation.

This indicates that the volume expansion for each 15° interval of rotation is more rapid in the cylinder than in the spherical wedge and the more rapid expansion of a gas means a more rapid drop in its pressure, especially the explosion pressure of combustion. The slower rate of volume expansion in the spherical wedge is one of the inherent kinetic advantages of the spherical wedge over the cylinder.

Another advantage of the spherical wedge is the area of the driving plate exposed to the combustion pressure within. In the case of the piston head, its area is constant at 4.43 sq. in., whereas in the driving plate, the area varies from 3.800 sq. in. at the zero position to 16.764 sq. in. at the 120° position, an average exposed area of 8.77 sq. in. It should be noted that this area is twice the area of one side of the plate because the opposite sides are being acted upon by the combustion pressure in the two diametrically opposed wedges simultaneously. Also, when computing plate area exposed to gas pressure, the area of cylindrical portion of the plate is figured as a flat projected area adjacent to the flat circular segment area of the plate. The greater plate area multiplied by higher compression pressures per sq. in. result in a higher total combustion pressure acting on the plate than that acting on the piston.

Only in the length of the moment arm from the axis of rotation does the reciprocating engine exceed that of the rotary engine. The average moment arm of the crank in a reciprocating engine equals 0.9102 in. and that of the center of gravity of the plate equals 0.7036 in. The average turning-moment or torque of the reciprocating engine is 411 in. lbs., and that of the rotary engine is 598 in. lbs., which is a 45% increase over the reciprocating engine.

These torque figures are based on an assumed pressure of 13 lbs. sq. in. for the initial intake charge of air, which is the probably pressure at slow speeds. But as the engine speed increases, the pressure drops due to the greater resistance of air flow through the intake manifolds and valves. This is referred to as a drop in "volumetric efficiency" which is the ratio of the intake air pressure just before compression to atomospheric pressure of 14.7 lbs. sq. in. When volumetric efficiency drops, so does compression pressure and consequently, combustion pressure even more so, being a multiple of the first.

For this reason, high performance engines are sometimes equipped with superchargers, a pumping device operated off the engine shaft which forces air into the cylinder so that the initial charge is at atmospheric pressure or slightly above, thereby maintaining the volumetric efficiency at 100%. In racing engines, the cylinders are sometimes supercharged to 10 lbs. above atmospheric pressure.

In the spherical rotary engine of the present invention, supercharging is part of its design. It has been noted above that the volume of the plate's intake compartment is 7.5 cu. in., or 1.44 times the 5.25 cu. in. displacement of one spherical wedge. A portion of this air is used to scavenge the wedge near completion of exhaust and the remaining portion is then compressed prior to ignition. Depending on the timing of exhaust port closing, a condition predetermined in the design of a specific rotary engine, the volume of remaining air to be compressed can be such that the volumetric efficiency would be 100%, even at high engine speeds.

It should be noted that the displacement of the rotary engine of the present invention is a function of the height of the cylinder only and that it is a constant for a given displacement. Therefore, to see the effect of a change in the dimensions of the plate will have on the previously computed torque, a second computation has been made for a rotary engine of equal displacement and cylinder height but increasing the diameter of the cylinder from 3.42 inches to 4.00 inches and increasing the width of the driving plate from 1.875 inches to 2.25 inches. This increase in the diameter of the cylinder increased the diameter of the working sphere from 4.837 to 5.263 inches.

These changes increased the average area of the plate exposed to gas pressure from 8.77 sq. in. to 9.28 sq. in. It increased the average length of the plate moment arm from 0.7036 inches to 0.7642 inches and increased the theoretical torque from 598 in. lbs. to 658 in. lbs., a 10% increase in torque between the two equal displacement rotary engines; and a 60% increase in torque compared with the reciprocating engine. Also, the volume of the plate intake compartment increased from 7.5 cu. in. (1.44 times displacement) to 10.50 cu. in. (two times displacement) which makes possible a higher degree of supercharging than before, in this particular rotary engine.

Another very important aspect of the excess volume of fresh air drawn into the plate assembly for supercharing is its cooling effect on the inside surface of the plate. The outside surfaces of the plate are exposed to the intense heat of combustion and in order to prevent excessive expansion and possible seizure of the rotating elements, it is essential that the excess heat be drawn off and this is an additional function of the in-rushing fresh air.

There are several other desirable features inherent in the spherical rotary engine, one of which is the turbulence of the charge at the moment of ignition. It is well known that the rate of flame propagation through the combustible charge is increased by turbulence and that the rate of propagation is proportional to the degree of turbulence. The quicker complete combustion occurs in the early stages of expansion of the charge, the greater will be the amount of heat energy liberated which can be converted into mechanical energy. Also, with turbulence, the charge has less tendency to knock or detonate upon ignition, and therefore, higher compression ratios can be used which result in both higher combustion pressures and thermal efficiency.

Referring now to FIG. 3, it should be noted that the plate transfer portholes 88a, 88b, 90a and 90b are provided with spiral vanes which are an integral part of a thin wall cylinder, slightly tapered, which is pressed into the drilled portholes. When fresh air is transferred from the plate intake compartment to the spherical wedge, it is being pushed through these holes at a fairly high velocity whereby the spiral vanes impart a whirling motion to the air. This not only assists in the scavenging of the spherical wedge of the burnt gases but sets up the desired turbulence on compression which also aids dispersion and vaporization of the fuel injected into the compressed air prior to ignition.

It should be further noted that the fresh air dispersed in the hot burning gases during scavenging of the spherical wedge, upon entering the exhaust manifold also fosters "after burning", a process of further oxidation of the unburnt carbon particles transforming the carbon monoxide (a poisonous pollutant) into carbon dioxide, a harmless gas. This action is similar to that taking place in a thermal reactor, a device attached to the exhaust systems of some engines which receive the necessary fresh air from an external pump driven off the engine shaft.

Another desirable feature of the present invention is the movement of the compressed charge past the fuel injection nozzle and spark plug during approximately 35° of each 180° rotation. This means that the nozzle and spark plug are exposed to intense heat of combustion for only a short period of time during each revolution and this should therefore increase the useful life of these parts.

Another advantage of the spherical rotary engine of the present invention is the simplicity of the valve arrangement. Only two inlet valve pieces, rotating on stationary intake tubes, plus two plate transfer sleeve valves are required for operation. Further, these valves are each self-activated with respect to timing, and no auxiliary shafts, gears, springs, etc. are necessary to operate them.

However, the main overall advantage of the spherical rotary engine of the present invention is its smooth, vibrationless operation. There are no adverse inertia forces of reciprocating pistons, tappet rods, valves, valve lifters, springs, etc., all of which are sources of vibration and noise in reciprocating engines. In addition, there is no torsional vibration which is sometimes present in reciprocating engines due to the torque impulses impressed alternately on front and rear ends of a lengthy crank shaft which causes a slight windup and then unwinding of the shaft during its rotation.

In the rotary engine of the present invention, all moving parts rotate in a single direction. They are symmetrical in shape and therefore can be balanced individually so that when assembled, the total rotating mass will be dynamically balanced. Further, the weight of the rotating drum can be made heavy enough to serve as a flywheel, storing the energy of the fluctuating torque impulses impressed on the driving plate during each half revolution and returning it to the engine shaft as a usable uniform torque during each full revolution.

Another comparable advantage of the spherical rotary engine is its smaller bulk and weight for a given displacement, which is approximately 40% less than a comparable reciprocating engine. The saving in bulk and weight should be especially helpful in developing the rotary engine for diesel operation.

The engine of the present invention could also be operated as a diesel engine with obvious modifications. The operating pressures in a diesel engine are much higher and therefore, its construction must be made much heavier and stronger with a higher factor of safety. No electric spark plugs and ignition system is needed in a diesel engine because the high compression of air raises its tempature to about 1000°F, sufficient to cause spontaneous ignition when the fuel is injected. Also, because of the high compression pressure, the thermal efficiency of the diesel engine is much higher, which together with the less costly type of fuel it uses, should make a rotary diesel engine even more economical to operate.

While a single preferred embodiment of the present invention has been disclosed herein for purposes of illustration, it is obvious that many variations and modifications could be made thereon. It is intended to cover all of these variations and modifications which fall within the scope of the invention as defined by the following claims.

What is claimed is:

1. A rotary engine comprising a casing having a cavity therein, said casing having air intake, fuel inlet and exhaust ports therein communicating with said cavity, an engine shaft rotatably mounted in said casing, a cylindrical member mounted for rotation in said casing, said cylindrical member being directly drivingly connected to said shaft and having a combustion chamber defined in the wall thereof, said combustion chamber registering with said fuel inlet port in at least one operative position thereof, and said exhaust port in at least one other operative position thereof, and a drive member movably mounted on said cylindrical member to drive same, said cylindrical member, said drive member and the inner wall of said casing defining a compression-expansion chamber, means operably connecting said air intake port to said compression-expansion chamber, said compression-expansion chamber being operably connected to said combustion chamber and being expandable by the combustion of gases within said combustion chamber to move said drive member.

2. The engine of claim 1 wherein the axis of rotation of said drive member is different from the axis of rotation of said cylindrical member.

3. The engine of claim 1 wherein the axis of rotation of said cylindrical member is parallel to the axis of rotation of said shaft.

4. The engine of claim 3 wherein the axis of rotation of said drive member is different from the axis of rotation of said cylindrical member.

5. The engine of claim 1 wherein said means operably connecting said air intake compartment to said compression-expansion chamber comprises an air intake compartment in said drive member, said air intake compartment being in communication with said compression-expansion chamber.

6. The engine of claim 5 wherein said air intake port comprises an intake conduit extending into said casing from the exterior thereof.

7. The engine of claim 6 wherein said drive member is rotatable about said air intake conduit.

8. The engine of claim 7 wherein said means operably connecting said air intake compartment to said compression-expansion chamber comprises valve means operatively connecting said air intake port to said air intake compartment.

9. The engine of claim 5 wherein said means operably connecting said air intake compartment to said compression-expansion chamber comprises valve means operatively connecting said air intake port to said air intake compartment.

10. The engine of claim 5 wherein the maximum volume of said intake compartment is greater than the maximum volume of said compression-expansion chamber.

11. The engine of claim 5 wherein said compression-expansion chamber has a variable volume.

12. The engine of claim 11 wherein the maximum volume of said intake compartment is greater than the maximum volume of said compression-expansion chamber.

13. The engine of claim 1 wherein said compression-expansion chamber has a spherical wedge shape.

14. A rotary engine comprising a casing having a cavity therein, said casing having air intake, fuel inlet and exhaust ports therein communicating with said cavity, a cylindrical member mounted for rotation in the wall of said casing adjacent said cavity and having a combustion chamber therein, said combustion chamber registering with said fuel intake port in at least one operative positive thereof and said exhaust port in at least one other operative position thereof, a drive member movable within said casing and drivingly connected to said cylindrical member to rotate same, a compression-expansion chamber defined by the wall of said casing, said cylindrical member and said drive member, said compression-expansion chamber being operably connected to said combustion chamber, an air intake compartment in said drive member, said air intake compartment being operatively connected to said intake port and means for connecting said intake compartment to said compression-expansion chamber.

15. The engine of claim 14 wherein said intake compartment has a variable volume and said compression-expansion chamber has a variable volume and wherein the maximum volume of said intake compartment is larger than the maximum volume of said compression-expansion chamber.

16. The engine of claim 14 wherein said compression-expansion chamber communicates with said combustion chamber while said combustion chamber is in communication with said exhaust port.

17. The engine of claim 14 wherein said connecting means comprises turbulence imparting means for imparting turbulence to the air charge as said charge moves from said intake compartment to said semicircular cavity.

18. The engine of claim 17 wherein said turbulence imparting means comprises spiral vanes.

19. The engine of claim 14 said connecting means comprises valve means operatively connecting said intake-compartment and said compression-expansion chamber.

20. The engine of claim 19 wherein each of said circular members has a cylindrical projection thereon for engagement with said cylindrical member.

21. The engine of claim 20 wherein said valve means is situated adjacent said cylindrical projection.

22. The engine of claim 21 wherein said valve means comprises a cylindrical plate sealingly engaging said cylindrical portion.

23. The engine of claim 22 wherein said plate is interposed between said drive member and said cylindrical member.

24. The engine of claim 23 wherein said plate has an outwardly extending peripheral lip.

25. The engine of claim 24 wherein the expansion of gases in said compression-expansion chamber pushes said lip to displace said plate relative to said cylindrical portion.

26. The engine of claim 14 wherein said drive member has an annular portion sealingly engaging the wall of said cavity.

27. The engine of claim 26 wherein said drive member comprises a pair of spaced circular members, a partition member operatively connected said circular members and dividing the circular space therebetween into two substantially semicircular cavities.

28. The engine of claim 27 wherein each of said circular members has a cylindrical projection thereon for engagement with said cylindrical member.

29. The engine of claim 28 wherein said partition member has a cylindrical projection thereon.

30. The engine of claim 26 further comprising means for operatively connecting said air intake port to one of said semi-circular cavities.

31. The engine of claim 30 wherein said connecting means comprises valve means for intermittently connecting said intake port and said semicircular cavity.

32. The engine of claim 31 wherein said valve means divides said semicircular cavity into two air intake compartments.

33. The engine of claim 32 wherein each of said air intake compartments has a variable volume.

34. The engine of claim 32 wherein said valve means is movable within said semicircular cavity to vary the volume of said intake compartments, respectively.

35. The engine of claim 34 wherein said partition member has a cylindrical projection thereon.

36. The engine of claim 35 wherein said valve sealingly engages said cylindrical projection as it is moved within said semicircular cavity.

37. The engine of claim 14 further comprising an air intake conduit operatively connected to said air intake port.

38. The engine of claim 37 wherein said connecting means comprises valve means for intermittently connecting said intake port and said semicircular cavity.

39. The engine of claim 38 wherein said valve means is rotatable about said conduit.

40. The engine of claim 37 wherein said drive member is rotatable about said conduit.

* * * * *